Jan. 31, 1956   C. L. WATERHOUSE ET AL   2,733,096
UNIT BODY FRAME FOR AUTOMOTIVE VEHICLE
Filed Jan. 29, 1949   8 Sheets-Sheet 1

Inventors
Charles L. Waterhouse,
John W. Bruno &
Louis Thoms
Spencer, Wilhite, Helwig & Baillio
Attorneys

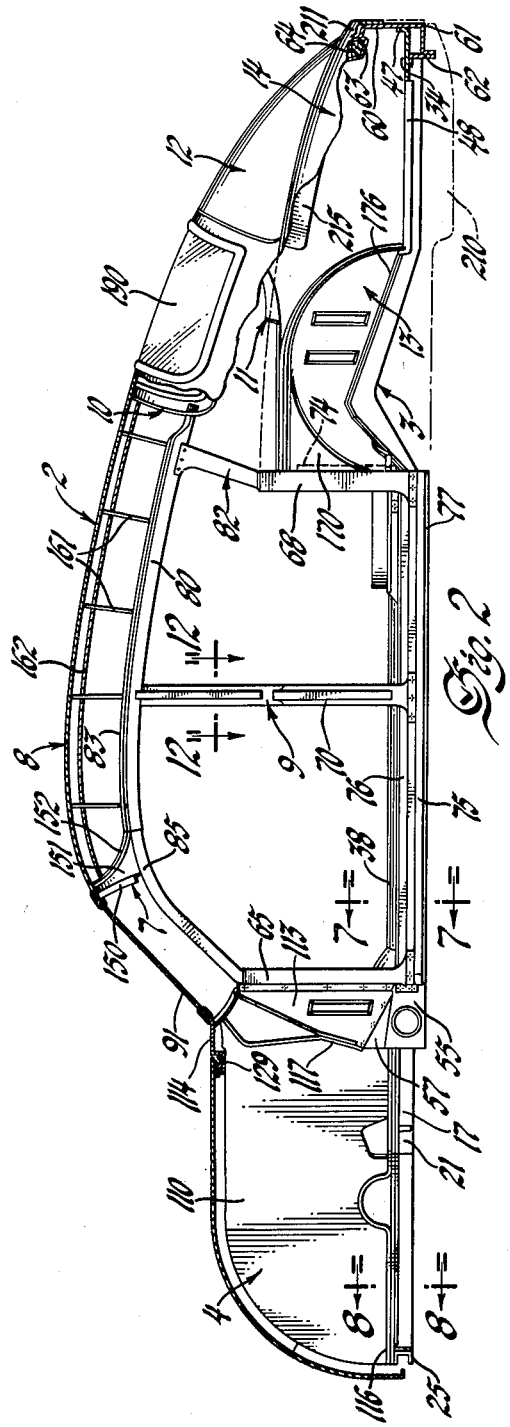

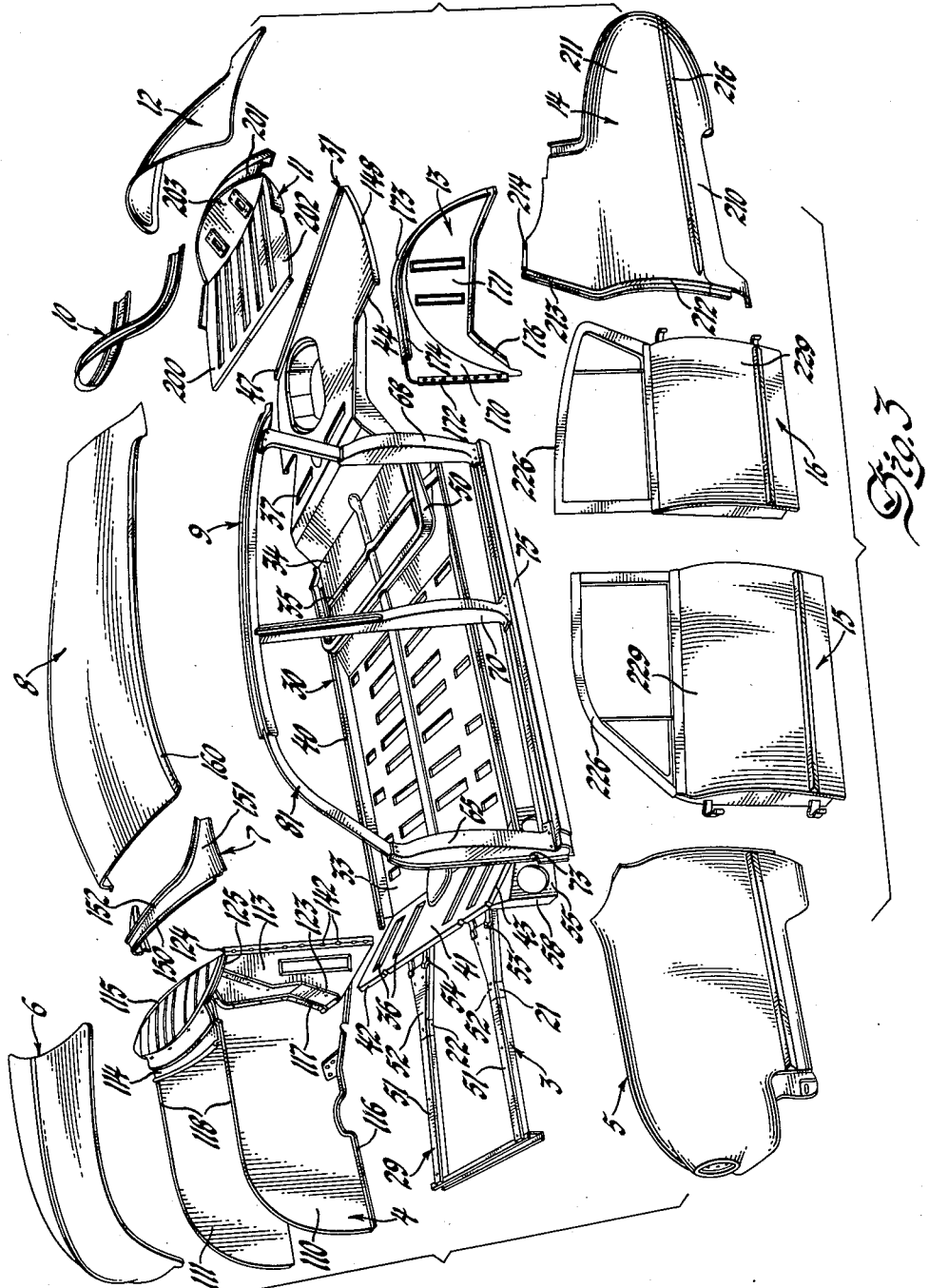

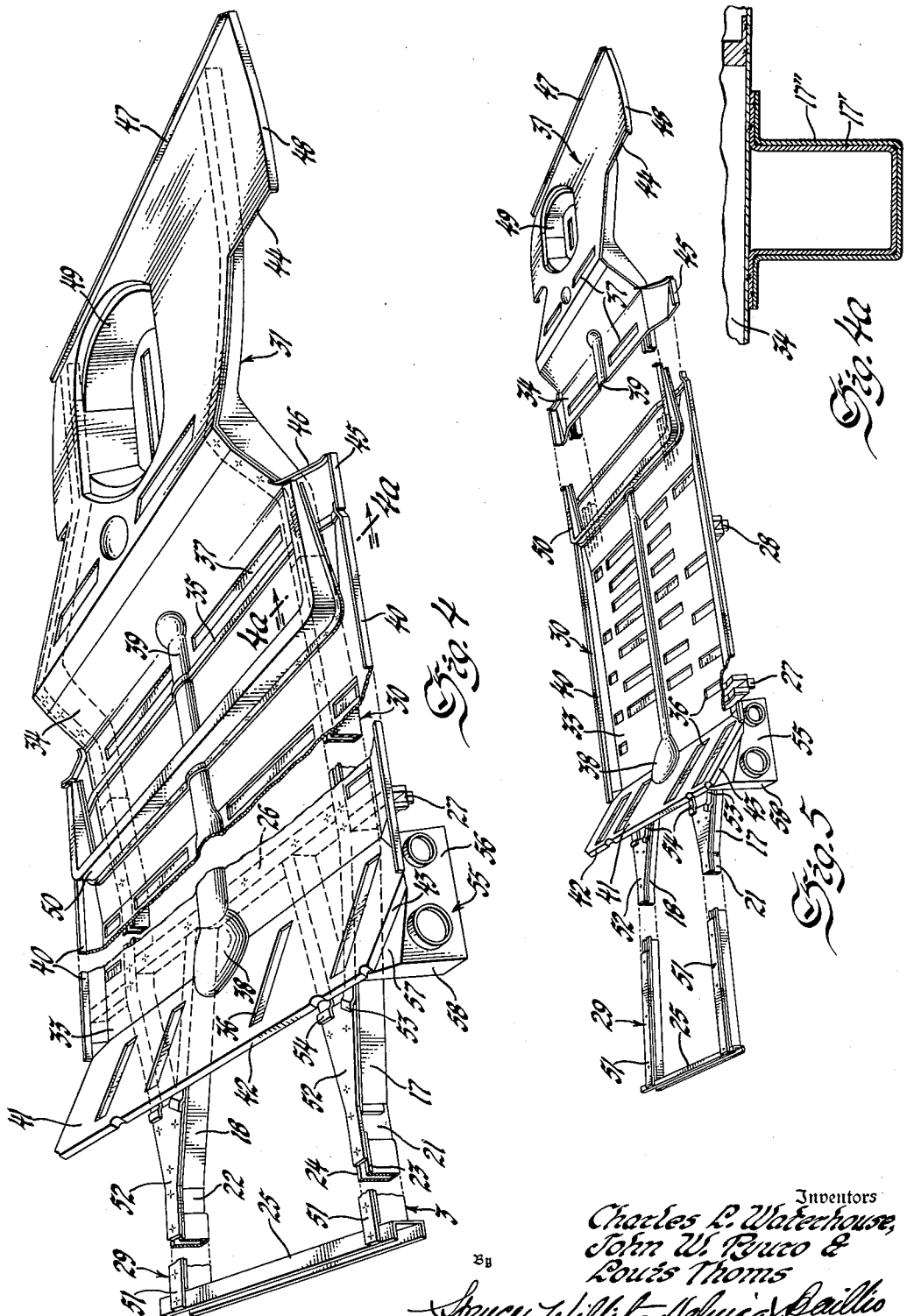

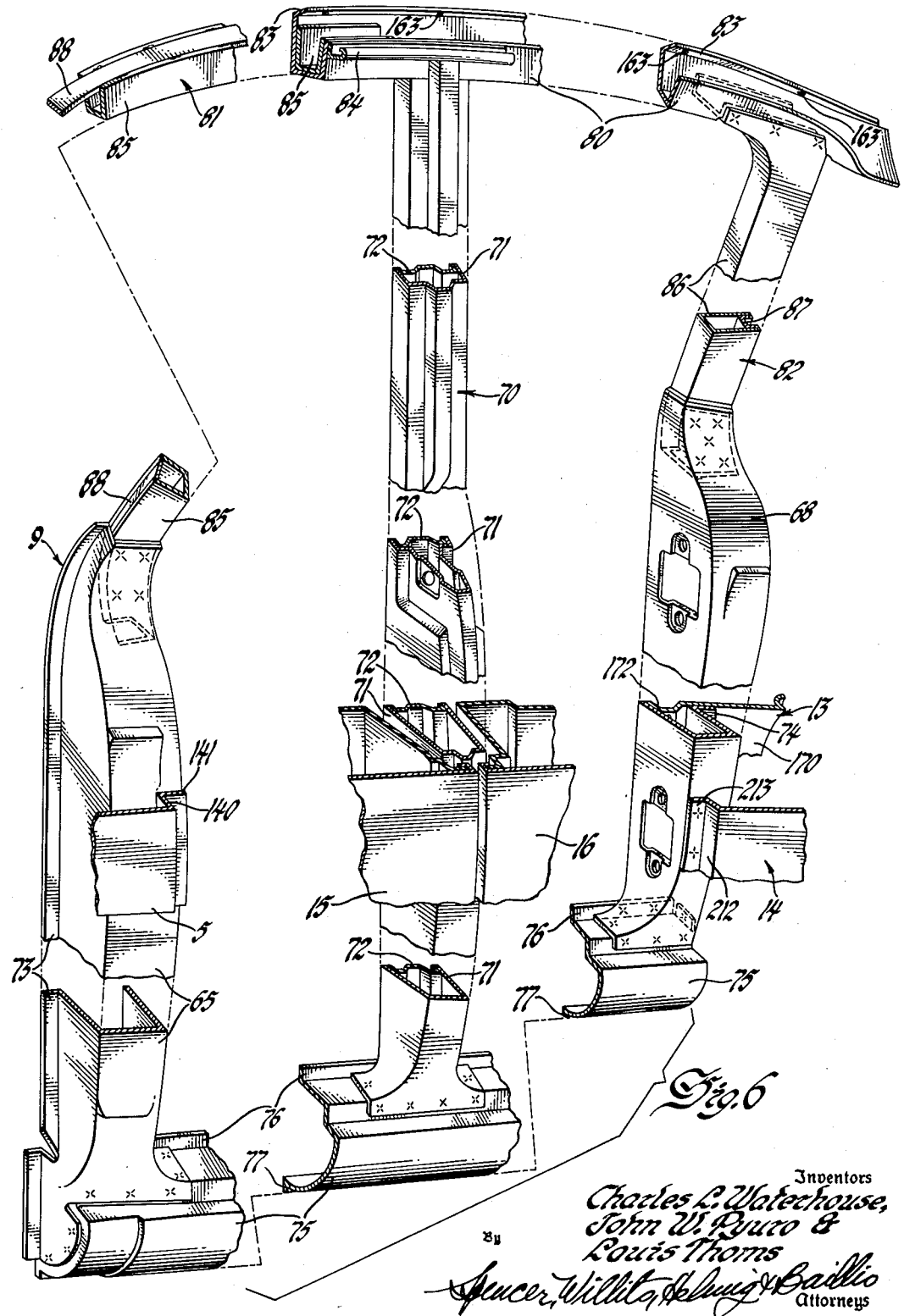

Jan. 31, 1956  C. L. WATERHOUSE ET AL  2,733,096
UNIT BODY FRAME FOR AUTOMOTIVE VEHICLE
Filed Jan. 29, 1949  8 Sheets-Sheet 6

Inventors
Charles L. Waterhouse,
John W. Ryuro &
Louis Thoms
By Spencer Willits Helwig Baillio
Attorneys

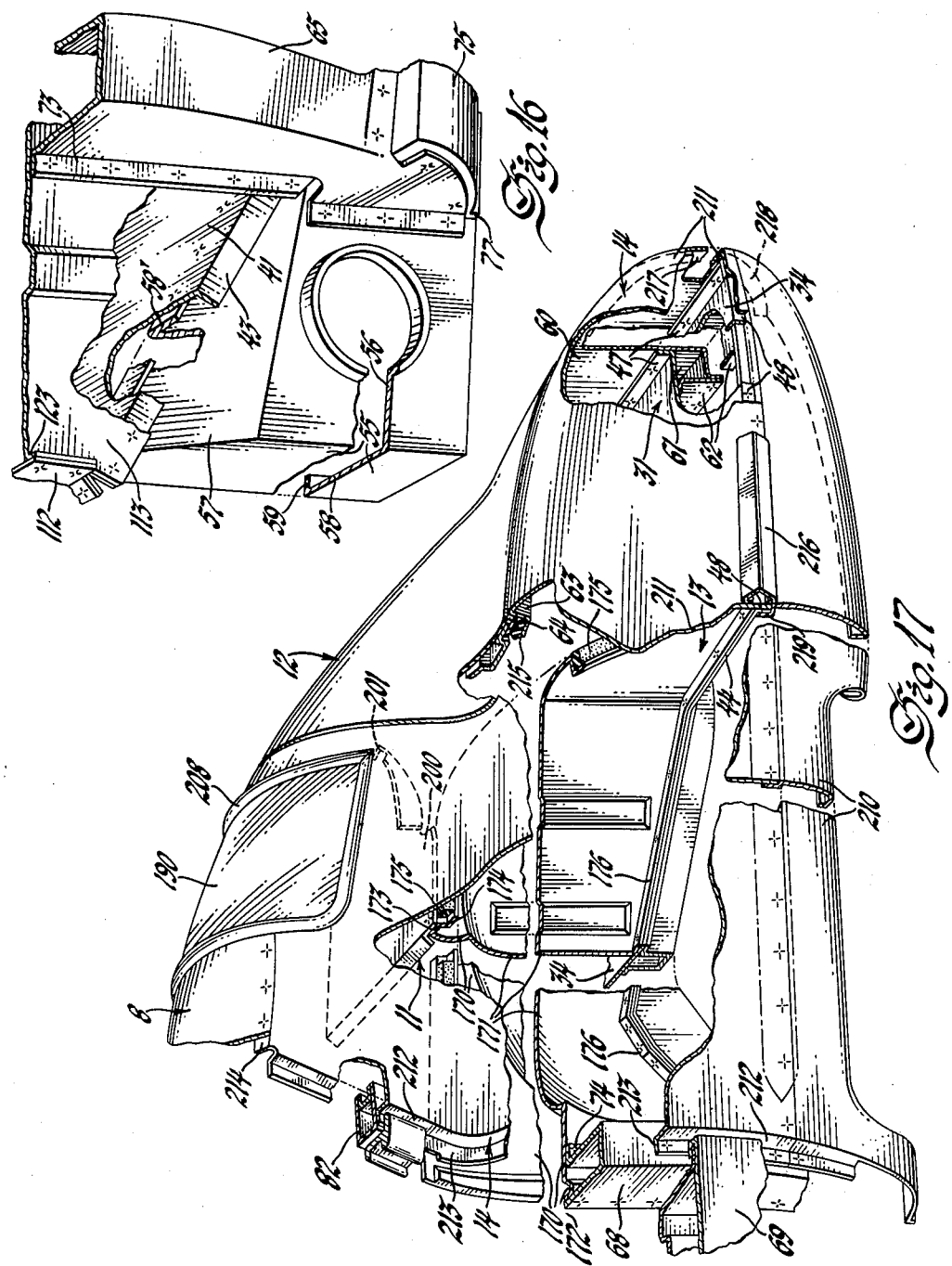

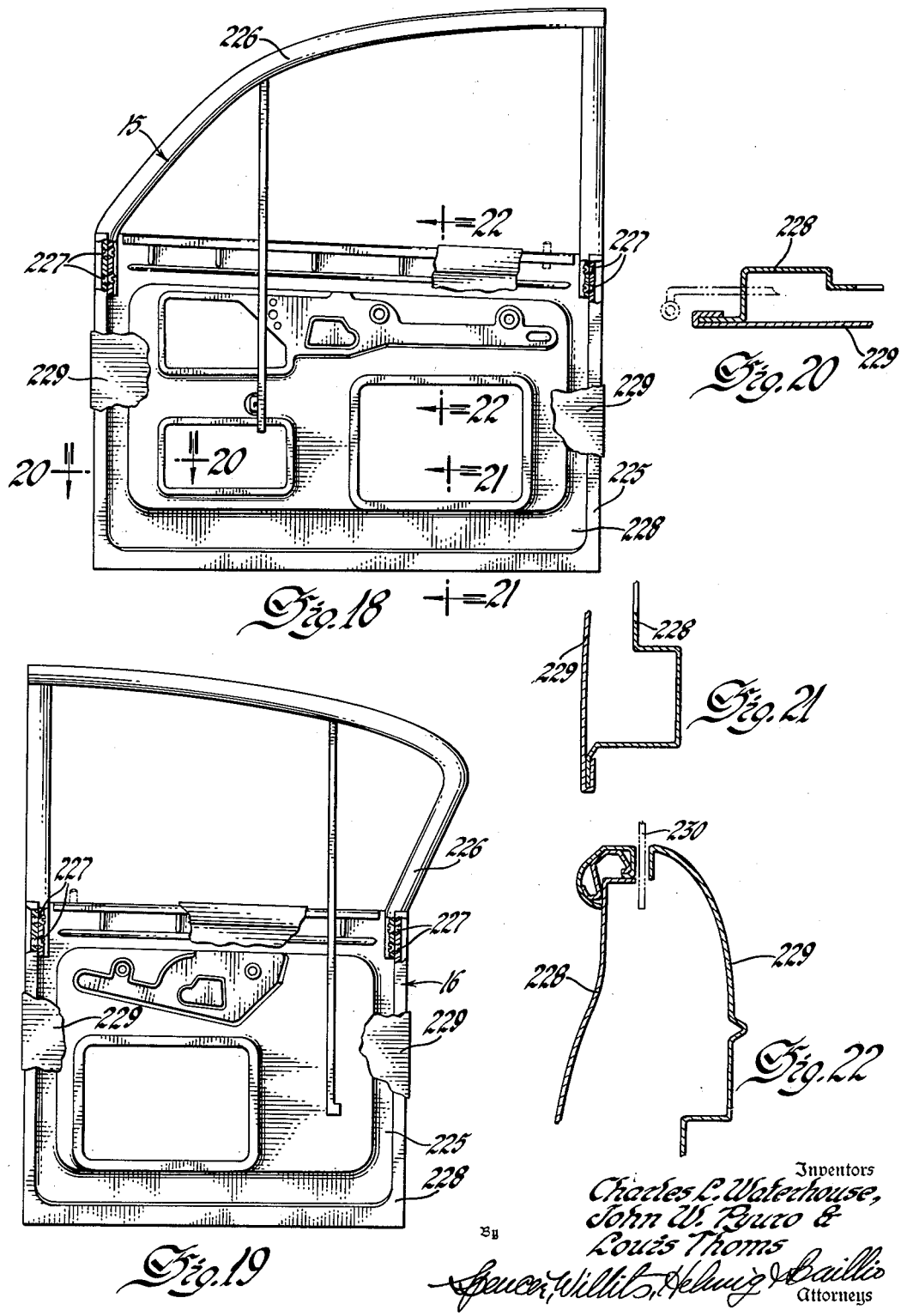

United States Patent Office 2,733,096
Patented Jan. 31, 1956

2,733,096

UNIT BODY FRAME FOR AUTOMOTIVE VEHICLE

Charles L. Waterhouse, Inkster, John W. Pyuro, Detroit, and Louis Thoms, Birmingham, Mich., assignors to General Motors Corporation, Detroit, Mich., a corporation of Delaware Application January 29, 1949, Serial No. 73,484

14 Claims. (Cl. 296—28)

This invention relates to automobile bodies and frames of the unitary type, that is, in which the formerly conventional separate body and chassis frame are combined in a single integral structure.

Although the advantages of this type of automobile construction in reduced weight and material cost have been recognized for some time, the embodiments of the idea thus far proposed in the art have either failed to accomplish more than a small part of the economies expected or have entailed additional disadvantages in inconvenience of assembly, decreased occupant visibility, and/or restriction of design to fairly conservative external car appearance.

It is the principal object of the instant invention to provide an improved body-frame construction for automobiles featuring a highly functional design with respect to strength versus weight and which is most satisfactorily adapted to accomplish a long, low vehicle profile of pleasing external appearance.

It is a further object to provide such a body-frame construction wherein each usable element of the body superstructure, including the instrument panel, rear package tray, rear seat riser, front and rear wheelhouse inner panels, etc., performs important structural functions cooperatively with the other elements in effecting an extremely strong, light weight body frame.

A still further object is to provide such a body-frame readily assemblable from a relatively small number of panels and subassemblies, thereby effecting a considerable saving of time normally used in the master jig, each of the various panels and subassemblies being so designed and arranged with inter-abutting flanges as to permit the use of short arm welding tools almost exclusively.

Other objects of the invention include the provision of replaceable aluminum die-cast upper door frame sections offering economical style modification, ultra narrow front upper hinge pillars for maximum visibility and occupant shoulder width, and an underbody extending the full bumper-to-bumper length of the car for maximum rigidity but designed for economical shipping in three sections, as well as many other features and advantages all of which will be fully understood from the following description considered in connection with the drawings, in which:

Figure 2 is an enlarged side elevational view of the assembled body-frame with parts broken away and in section.

Figure 3 is an exploded view in perspective showing the major panels and subassemblies which make up the body-frame, certain complementary units forming the far side of the structure as viewed being deleted for clarity of illustration.

Figure 4 is an enlarged perspective view of the underbody, the three sections thereof being shown in assembled relation.

Figure 4a is a detail sectional view taken substantially on line 4a—4a of Figure 4.

Figure 5 is a view similar to Figure 3 but on a reduced scale and showing the three sections of the underbody disassembled from each other.

Figure 6 is an enlarged perspective view of the left side-frame, with portions broken away and in section, plus fragments of the front and rear doors, front and rear fender and quarter panels and the rear wheelhouse inner panel.

Figure 7 is an enlarged sectional view taken on the lines 7—7 of Figures 1 and 2, showing the juncture of the side-frame's rocker panel to the underbody and the relationship thereto of the scuff plate and lower portion of the front door.

Figure 8 is an enlarged sectional view taken on lines 8—8 of Figure 2 showing the juncture of the front end structure's wheelhouse inner panel with the underbody.

Figure 16 is an enlarged perspective view showing the juncture of the side-frame and the front end structure's dash end panel with the underbody's tie plate and front floor panel.

Figure 17 is a perspective view of the vehicle's rear quarter section, with portions broken away to show the junctures between the various units making up the same.

Figures 18 and 19 are elevational views of the front and rear doors, respectively, with all but small portions of their outer panels broken away.

Figures 20, 21 and 22 are detail sectional views taken on corresponding numbered lines of Figure 18 showing the construction and interconnection of the door inner and outer panels.

Figure 1:
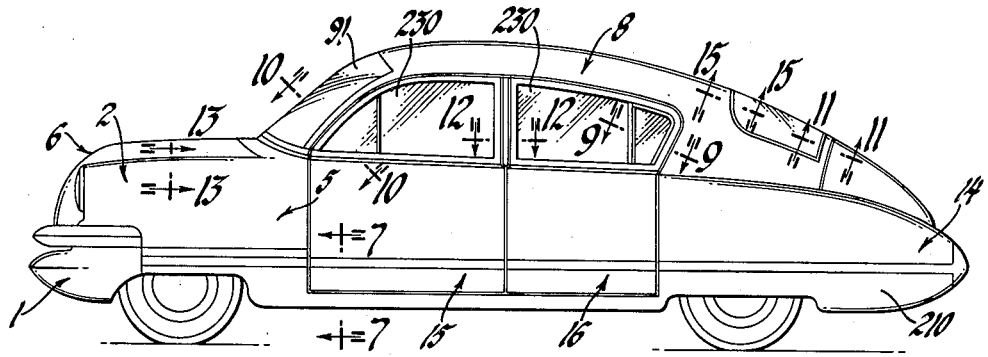
Figure 1 is a side elevational view of an automobile incorporating the body-frame construction of the instant invention.

Referring to the drawings, the numeral 1 designates a four-door sedan type automobile having a body-frame 2 embodying the principles of the invention. The body-frame, shown minus the doors in Figure 2, is of all steel welded integral construction, and comprises twenty major units (see Figure 3) in the form of composite welded subassemblies and panels, namely: an underbody 3, front end structure 4, front fender and quarter panels 5, engine hood panel 6, windshield header 7, roof panel 8, sideframes 9, backlight opening reinforcement 10, package tray 11, deck lid 12, rear wheelhouse inner panels 13, rear fender and quarter panels 14, front doors 15 and rear doors 16. In the interests of simplifying the drawings the right front and rear fender and quarter panels, side frame and rear wheelhouse inner panel have been omitted for the most part as it will be understood their construction is similar to their left side counterparts. Further it should be noted at the outset that the doors 15, 16, engine hood panel 6 and deck lid 12 are hingedly attached for opening and closing and are of course not relied on for any contribution to the rigidity of the body-frame. All other units, however, including the front and rear fender and quarter panels 5, 14, serve importantly as stressed members in the assembly.

Underbody

The underbody 3, best shown in Figures 4 and 5, extends the full bumper-to-bumper length of the automobile 1 and for economy in shipping is preferably fabricated in three sections, illustrated in disassembled relation in Figure 5. The structure as a whole comprises left and right longitudinal sills 17 and 18 of upwardly open channel section with oppositely extending flanges 19, 20 (see Figure 7) along the upper edges of the channel walls. These sills are disposed somewhat inwardly of the bottom lateral extremities of the vehicle and extend substantially parallel with each other from the rear end of the vehicle to just aft of the engine compartment at which point they converge somewhat with their front ends terminating in welded joints respectively with left and right frame members 21 and 22 of similar channel section having flanges 23, 24 (Figure 8). Forwardly of their juncture with the front ends of sills 17 and 18, the frame members 21 and 22 extend generally parallel with each other to terminate in abutment with a forwardly open channel section front cross member 25, and rearwardly of said juncture they converge somewhat and terminate in abutment with a front intermediate cross member 26, which is of upwardly open and oppositely flanged channel section similar to the sills 17, 18 and frame members 21, 22. Cross member 26 interconnects the sills 17, 18 just aft of the vehicle's transmission. The sills 17, 18, as shown, are provided with the usual kick-ups in the region of the vehicle's rear axle to provide for the latter's displacement in operation. Just aft of the front seat back location is a rear intermediate cross member (not shown) interconnecting the sills 17, 18 and of similar upwardly open and oppositely flanged channel section.

As earlier referred to, the underbody 3 comprises three sections, these being, as shown in Figure 5, a front section 29, intermediate section 30 and rear section 31. The joint between the rear and intermediate sections is located opposite the rear seat position and is made by forming each of the sills 17, 18 in two separate portions. As shown in Figure 4a, the portion 17' which forms the sill 17 for the rear section has a slightly narrower channel width than the portion 17" which forms the sill 17 for the intermediate section, providing for their telescopic interconnection and welding together at final assembly. Likewise, the frame members 21, 22 are each formed in two separate portions to provide a similar telescopic joint between the front and intermediate sections 29 and 30, the joint being preferably located just forward of the termini of the sills 17, 18, as shown in Figure 5.

Extending transversely outward from the sills 17, 18 on each side of the underbody, in the manner of cantilever extensions of the front and rear intermediate crossmembers are two braces 27 and 28. These braces are of upwardly open flanged channel section like the sills 17, 18, and, in addition, have their end portions flanged outwardly to provide surfaces for welding to the sills 17, 18 and (at final assembly) to the side frames 9.

Welded to the flanges 19 and 20 of the sills 17, 18 and the corresponding flanges of the intermediate crossmembers and braces are front and rear floor panels 33 and 34, overlapping each other and seam welded together at 35. These floor panels are provided with stiffening embossments 36, 37 and with embossments 38, 39 for the vehicle's transmission and drive shaft. The front floor panel 33 has upwardly extending flanges 40 along its side edges and an integral toe board portion 41 inclined at the usual angle and provided with downwardly extending flanges 42, 43 along its front and side extremities. The rear floor panel 34 is cut out at 44 for the rear wheels and its marginal edges have upwardly extending flanges 45, 46, 47 forwardly of the wheel opening and across the back, and downwardly extending flanges 48 along the sides rearwardly of the wheel opening. A spare wheel well 49 may also be formed during the pressing of the rear floor panel.

The joint between the front and rear floor panels 33, 34 as well as the underbody as a whole, is greatly strengthened by welding the rear seat riser 50 thereto. This member, which is of U-shape with the legs of the U extending rearwardly and overlying adjacent portions of both front and rear floor panels, is formed of downwardly open channel section having oppositely extending flanges along its open edges for welding to the floor panels. The depth of the channel section in the legs decreases rearwardly to provide the desired slant for the vehicle's rear seat.

Extending downwardly from each end of the toe board 41 is a tie plate 55 which serves as a support for anchoring the lower front and rear corners, respectively, of the side frame 9 and the front fender and quarter panel 5 to the underbody 3. As will be seen in Figure 16, the tie plate 55 has a laterally outward facing vertical wall 56, the upper portion 57 of which slopes inwardly under the end of the toe board 41 and terminates in an outwardly extending flange 58' which is pinch welded to the underside of the toe board. For stiffening purposes a front wall 58 is also provided which extends inward perpendicularly to the wall 56 and has a rearwardly extending flange 59 along its inner marginal edge.

Forwardly of the toe board 41 the channel section sills 17, 18 and frame members 21, 22 are closed by cover plates 51, 52, 53 and 54 welded to the flanges as indicated in Figure 8.

As will be more fully appreciated as the description of the other units of the body-frame is taken up, the underbody 3, in addition to being a simply and cheaply constructed body floor and running gear support of great rigidity in proportion to its weight, is peculiarly adapted for assembling the body superstructure to it with unusual convenience while still obtaining the maximum possible contribution of each superstructure unit to the strength of the vehicle as a whole.

At final assembly, a transverse rear panel 60 of forwardly open channel section, as shown in Figure 2, is installed by welding its web portion 61 to the upwardly extending flange 47 provided along the rear edge of the underbody's rear floor panel 34. This rear panel 60 is additionally secured by an angle section brace member 62 which has one of its legs welded to the downwardly flanged inner edge of the rear panel's lower wall and its other leg welded to the underside of the underbody's rear floor panel 34. The upper wall of the rear panel 60 is shaped to form a gutter channel 63. With the deck lid 12 in closed position its rear edge rests on a flexible rubber sealing element 64 fixedly disposed in the gutter channel 63. The ends of the rear panel's web portion 61 extend beyond the lateral extremities of the rear floor panel to provide lateral bracing for the rear ends of the rear fender and quarter panels 14, as will be hereinafter described.

Side frames

Only the left side-frame 9, an enlarged view of which is shown in Figure 6, will be described since its right side counterpart is of the same construction except being the reverse thereof in all respects. This unit comprises a front hinge lower pillar 65 of inwardly open channel section extending up to the belt line of the vehicle and adapted for hingedly supporting the front door 15 at the front end of the latter, a rear hinge lower pillar 68 of generally similar form for hinging the rear end of the rear door 16, and a full height center pillar assembly 70 disposed between them consisting of an inwardly open outer channel section 71 and a channel closure plate 72 of W-section nesting therein and pinch welded to the outer channel adjacent their respective open edges. The front wall of the front lower pillar 65 is provided with a forwardly extending flange 73, and the rear wall of the rear lower pillar 68 has a similar rearwardly extending flange 74. The bottom of the side frame consists of an inwardly presenting generally C-section rocker panel 75 extending the full length thereof, and to which are welded the lower ends of the front, center and rear pillars. Upwardly and downwardly extending flanges 76 and 77 respectively are provided along the inner edges of the rocker panel, flange 76 being adapted to abut and be pinch welded to the upwardly extending side flanges 40 and 45 of the underbody floor panels at final assembly, as shown in Figure 7. Flange 77 serves both to stiffen the rocker panel and as a surface for convenient pinch welding of the same to the tie plate 55 (Figure 16), front brace 27 (Figure 7) and rear brace 28 at final assembly.

A roof side rail 80 of upwardly open channel section defines the upper margin of the side frame, and is welded to the center pillar assembly 70 and to the front and rear upper hinge pillar assemblies 81 and 82. The inner side wall of the rail 80 has a flange 83 along its upper edge for stiffening purposes and the outer side wall of this rail has the inner wall of an upwardly open channel-like section drip moulding 84 pinch welded thereto.

Figure 10:
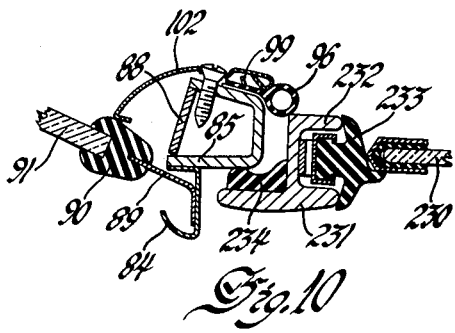
Figure 10 is an enlarged sectional view taken on lines 10—10 of Figure 1 showing the means of supporting the side of the windshield from the drip moulding attached to the side-frame's front hinge pillar, plus details of the front-door's upper frame, weather-stripping, etc.
Figure 14:
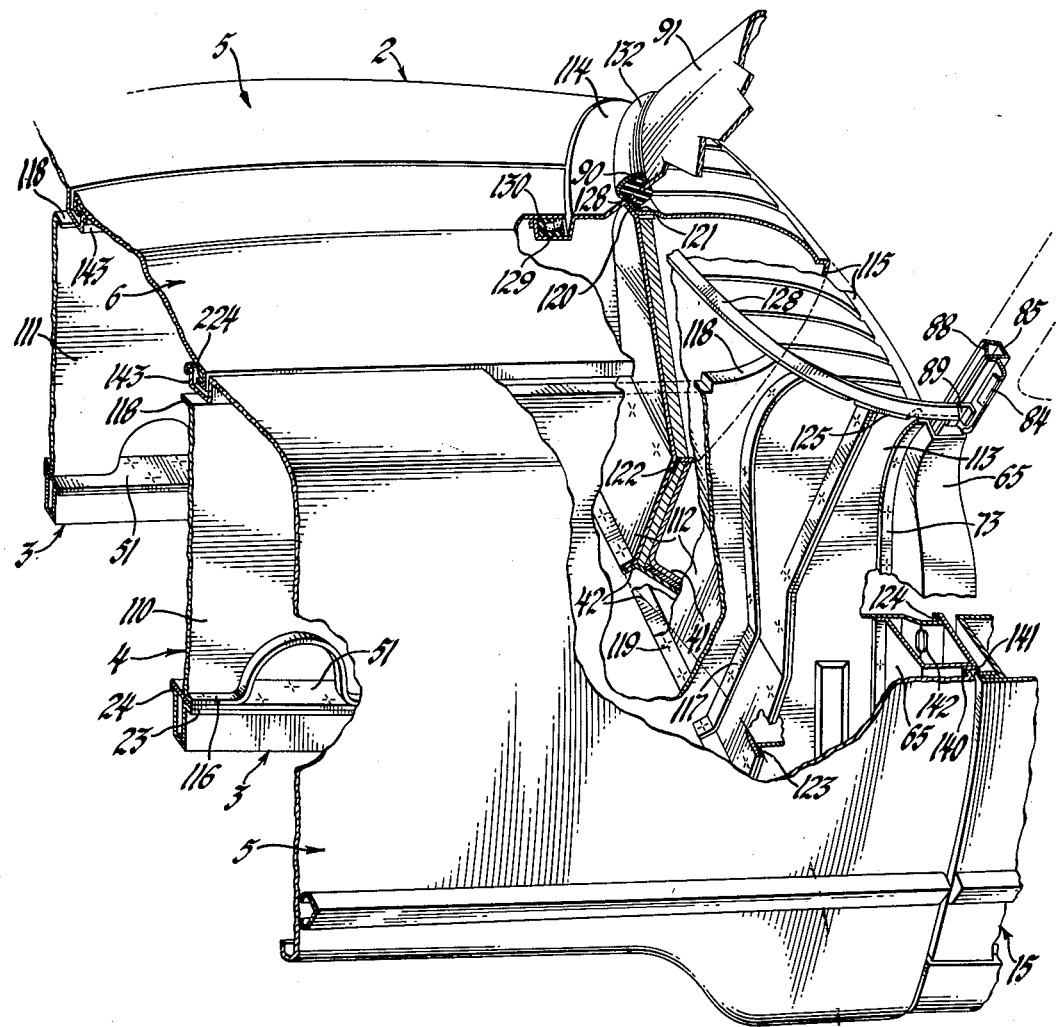
Figure 14 is an enlarged perspective view showing the interconnection of the dash, cowl, instrument and wheelhouse inner panels of the front end structure and the juncture thereof with the underbody, front fender and quarter panels and the side frame and windshield.

The front and rear upper hinge pillar assemblies 81 and 82 comprise forwardly and rearwardly open channels 85 and 86, respectively, the lower ends of which project into the upper ends of the lower hinge pillars 65, 68 and are welded thereto. As clearly shown in Figure 6, the upper end of the rear upper hinge pillar channel 86 is flanged to receive the roof side rail 80, and the upper end of the front upper hinge pillar channel 85 nests within the front end of the rail 80, both joints providing free access for short arm spot welding tools. The drip moulding 84 is continued forwardly of the front end of the roof side rail 80 and follows the contour of the front upper hinge pillar channel 85 to the upper end of front lower hinge pillar 65, being pinch welded to the outer wall of the channel 85 as shown in Figures 10 and 14.

After welding the drip moulding to the front upper hinge pillar as just referred to, a windshield side supporting strip 89 (see Figure 10) is then welded to the drip moulding. As shown, the strip 89 is of angle section, one leg thereof providing a portion for convenient pinch welding to the web portion of the channel-like drip moulding 84 and the other leg extending outward therefrom to engage the rubber weather-strip 90 in which is set the windshield 91.

The rear upper hinge pillar channel 86 is closed by a nesting smaller section channel 87 pinch welded thereto adjacent their respective open edges, and the front upper hinge pillar channel 85 is closed by a spanner strip 88 tack welded to the walls of channel 85 and extending from the upper end of the lower front hinge pillar 65 to the front end of the roof side rail 80. This spanner strip, however, is not installed until final assembly of the body-frame to provide access for attaching the windshield header 7.

The side frame 9 as thus described consists in the main of relatively simple and economically formed elements, and being constructed as a complete unit effects a considerable saving of time normally spent in the master jig during final assembly of the body-frame. Further, the sectional configurations employed for its elements and the marginal flanges provided thereon affords convenient use of short arm welding tools in attaching adjacent units of the body-frame at final assembly.

The threshold of each door opening in the side frames 9 is trimmed with a scuff plate 92, shown in transverse section in Figure 7. As will be noted, the inner edge of this scuff plate has an integral upstanding portion 92' of downwardly open channel form, which serves both to conceal the rocker panel and floor panel attaching flanges 76 and 40, and as an abutment for the windlace 93 attached to the bottom of the door 15. Screw fastenings 94 and 95 secure the scuff plate to the rocker and floor panels.

Figure 9:
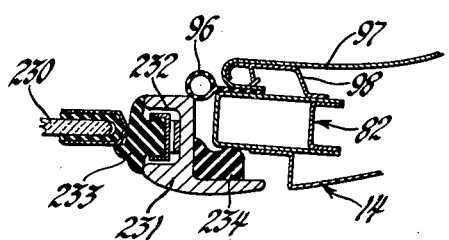
Figure 9 is an enlarged sectional view taken on lines 9—9 of Figure 1, showing the juncture of the rear fender and quarter panel to the side-frame's rear hinge pillar, together with details of the rear-door's upper frame, window mounting, weather-stripping and upholstery attachment.
Figure 12:
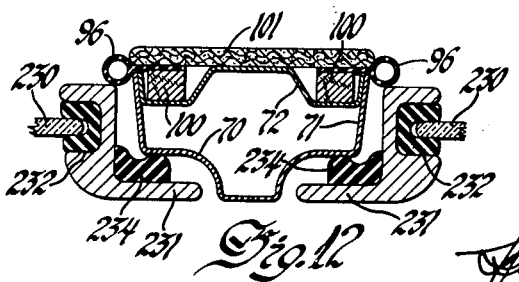
Figure 12 is an enlarged sectional view taken on lines 12—12 of both Figures 1 and 2 showing the construction of the upper portion of the side-frame's center pillar and the front and rear-doors' upper frames, together with details of the weather-stripping and upholstery.

Around the inner marginal edges of the door openings formed by the roof rail and the front, center and rear pillars of the side frames 9 are mounted the usual windlaces 96. These and the upholstery fabric 97 lining the interior of the passenger compartment are secured to the roof rail and the front and rear pillars by trim attaching strips 98 and 99 of conventional design, as indicated in Figures 9 and 10. In the case of the center pillar assembly 70, as shown in Figure 12, spacer strips 100 of wood or other fibre-like material are suitably secured to the W-section channel closure plate 72 and serve as anchoring bases for the windlaces 96 and the center pillar upholstery strip 101. 102 is the conventional trim moulding which borders the two ends and top of the windshield 91.

*Front end structure*

The front end structure 4, shown in Figures 2 and 3 (see Figures 8, 13, 14 and 16 for details), consists of left and right front wheelhouse inner panels 110, 111, a dash panel 112, left and right dash end panels (left 113 only being shown), a cowl center panel 114 and instrument panel 115.

The front wheelhouse inner panels 110, 111 are of generally flat sheet metal stampings which extend vertically upward of the underbody 3 along the frame members 21, 22 from front ends of the same to their juncture with the sills 17, 18 and thence along the latter to the dash panel 112 and toe board 41. Their rear and bottom marginal edges are provided with flanges 116 and 117 extending transversely outward with respect to the vehicle, and their front and upper marginal edges which are blended into a smooth curve conforming to the contour of that portion of the body superstructure are provided with an inwardly extending flange 118. Flanges 116 and the lower ends (not shown) of flanges 117 are adapted for weldably securing the front end structure to the frame members 21, 22, sills 17, 18 and toe board 41 of the underbody 3 at final assembly, as will be clear from Figures 8, 14 and 16.

The dash panel 112, the front face of which abuts and is welded to the flanges 117 on the front wheelhouse inner panels 110 and 111, extends the full width of the toe board 41 and has a flange 119 along its bottom marginal edge for convenient pinch welding to the toe board's flange 42 at final assembly. Its upper marginal edge is provided with an upwardly and forwardly extending flange 120 to which is pinch welded a similarly projecting flange 121 provided along the front of the upper wall of the instrument panel 115 (see Figure 14). The instrument panel is of generally C-shape in section with a downwardly extending flange 122 along its bottom marginal edge which is welded to the rear face of the dash panel 112, and with the latter and the dash end panels 113 to be presently described forms a cross beam of great strength between the front door hinge pillars substantially at the body belt line, thereby materially contributing to the torsional rigidity of the body-frame.

The dash end panels 113 formed of generally triangular shaped sheet metal stampings serve to tie the lateral extremities of the dash panel 112 to the front lower hinge pillar 65 of the side frame 9, and are provided along their front and rear marginal edges with outwardly and inwardly bent flanges 123 and 124, respectively, for convenient pinch welding to the dash panel and the rear wall of the pillar 65, the latter attachment being made at final assembly. In addition, it will be observed that the dash end panels 113 serve to close and form box sections with the hinge pillars 65, being welded to the flange 73 provided thereon during final assembly. The upper marginal edges of the dash end panels 113 are flanged as at 125 and anchored by pinch welding to the instrument panel 115 in substantial continuation with the flange 120 on the dash panel 112, and at final assembly their lower ends are pinch welded to the flanges 43 (see Figure 16) provided on the toe board 41.

The cowl center panel 114 bridges the spacing of the front wheelhouse inner panels 110, 111 between the vehicle's windshield 91 and the engine hood panel 6. Its transverse and rear extremities are pinch welded respectively to the flange 118 on the front wheelhouse inner panels and to a rearwardly and upwardly extending continuation 128 of the flange 121 on the instrument panel 115. Along its front marginal edge is formed an upwardly open gutter channel 129, in which may be disposed a flexible rubber sealing element 130 of conventional type. As shown in Figure 14, the double thickness of sheet metal provided by the continuation 128 of the instrument panel flange 121 and the rear edge of the cowl center panel 114 serves for supporting the bottom of the windshield 91 through the rubber weather-strip 90, which latter may be covered by a decorative trim moulding 132 if desired.

*Front fender and quarter panels*

The front fender and quarter panels 5 are each drawn and stamped in one piece from sheet metal. As shown in Figures 6 and 14, the rear marginal edge of these panels has an inwardly extending portion 140 and rearwardly extending flange 141 forming a recess for the front edge of the front door 15, and is secured to the front door lower hinge pillar 65 by spot welding the flange 141 to the outer wall thereof at final assembly. Access to the interior of the pillar 65 for the latter welding operation is obtained through holes 142 provided for this purpose along the rear marginal edge of the dash end panels 113. The inner marginal edge of each of the front fender and quarter panels forwardly of the cowl center panel 114 is formed with an integral upwardly open gutter channel 143, the web portion of which is conveniently pinch welded at final assembly to the inwardly extending flange 118 along the upper and front marginal edges of the front wheelhouse inner panels 110, 111 as will be clear from Figure 13. Rearwardly of the cowl center panel's gutter channel 129 the inner marginal edges of the front fender and quarter panels overlap the ends of the cowl center panel, and at final assembly a conventional metal finish junction is made between them. These and the similar metal finish junctions hereinafter described between the roof panel and the rear fender and quarter panels 14 are the only joints of this type employed in the construction of the body-frame. The marginal edges of the front fender and quarter panels 5 between each front hinge pillar and the adjacent front wheelhouse panel are pinch welded to the instrument panel's flange 121 at final assembly, a double thickness of sheet metal being thereby obtained for supporting the bottom of the windshield 91 in this section in the same manner as shown in Figure 14 with regard the cowl center panel 114.

The welding of the front fender and quarter panels to the elements of the front end structure 4 and to the front hinge pillar of the side frame 9, which with the design as described may be conveniently accomplished with short arm welding tools, not only serves to contribute materially to the bracing of the front end of the body superstructure but also has the additional advantage of eliminating all relative movement between the fenders and the adjoining parts of the body-frame. In the more conventional constructions, such relative movement necessitates the insertion of anti-squeak strips to insulate the fender from the body proper and thus avoid the noises incident thereto.

*Windshield header*

The windshield header 7 as shown in Figures 2 and 3 is of upwardly open channel section, and serves both to securely tie the left and right side frames 9 together at the front upper end of the passenger compartment and to support the front end of the roof panel 8 and the top of the windshield 91. The front wall of the channel section is bent forwardly and downwardly along its open edge to provide a flange 150 (Figure 2) which is pinch welded to the front marginal edge of the roof panel 8 during final assembly, the two thicknesses of metal thus obtained serving to support the top of the windshield through the rubber weather-strip 90 in the same manner as shown at the bottom of the windshield in Figure 14.

The web portion 151 at each end or lateral extremity of the windshield header 7 has an upwardly bent flange which is pinch welded to the inner wall of the front upper hinge pillar 85 at final assembly, prior to welding of the spanner strip 88 in place.

As will be noted in Figure 2, the web 151 and rear wall 152 of the header channel are flared rearwardly at their juncture with the side frame 9 to obtain the effect of a strong gusset in this section. By flaring the header channel rearwardly rather than forwardly as is conventional, a square rather than a rounded corner is obtained at the upper outer end of the windshield, with resultant increased visibility and no decrease in strength.

*Roof panel*

The roof panel 8 is secured at final assembly by pinch welding to the windshield header flange 150 as above referred to and extends rearwardly therefrom to the backlight opening reinforcement 10. Each side edge is provided with an outwardly extending flange 160 (Figure 3) which is anchored to the side frames at final assembly by pinch welding to the web of the channel section drip moulding 84. Bows 161 (Figure 2), extending transversely between the side frame roof rails 80 and anchored in apertures 163 provided therefor in flanges 83 on the latter, serve to support the head lining 162.

*Rear wheelhouse inner panels*

The rear wheelhouse inner panels indicated generally by the numeral 13 each serves structurally as a gusset member between the side frame's rear hinge lower pillar 68 and the underbody 3. Each of these panels is formed in one piece from sheet metal and, as shown in Figures 2 and 17, has a generally vertical forward portion 170 and an inwardly curved rearward portion 171, the latter providing side and peripheral clearance for the vehicle's rear wheel. The front marginal edge of the forward portion 170 forms a closure for the channel section pillar 68, being welded at final assembly to that pillar's rear wall flange 74 and to its front wall by means of the flange 172 provided therefor, as shown in Figure 6. Adjacent the upper marginal edge of the forward portion 170 is an outwardly extending flange 173 for welding to the package tray 11 at final assembly, and outwardly adjacent this flange is an outwardly and upwardly open L-shaped section 174 adapted for locating a rectangular section sealing strip 175 of soft rubber or like material. The L-shaped section 174 is continued rearwardly around the outer marginal edge of the panel's curved portion 171, in close conformity with the curvature of the rear fender and quarter panel 14, such that when the latter is installed at final assembly the strip 175 is compressed in tight sealing engagement with the inner surface thereof.

The lower marginal edge of the inwardly curved portion 171 conforms to the kick-up in the underbody 3 over the rear axle, and at final assembly is welded to the rear floor panel 34 thereof around the cut-out 44. At the front end this attachment is made by welding the lower edge of the portion 171 to the rear floor panel's upwardly extending flange 46 (Figure 4), and rearwardly thereof the portion 171 is provided with an outwardly extending flange 176 for welding to the upper face of the rear floor panel.

Backlight opening reinforcement

Figure 15:
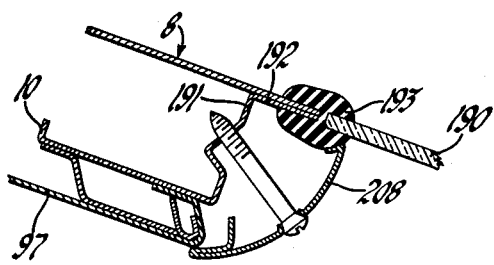
Figure 15 is a detail sectional view taken on lines 15—15 of Figure 1, showing the juncture of the roof panel and backlight opening reinforcement, together with details of the backlight mounting, trim moulding and upholstery attachment.

The backlight opening reinforcement 10 is a generally U-shaped member formed from sheet metal to provide an upwardly open channel section which serves to strengthen the rear marginal edge of the roof panel 8 and the upper marginal edges of the rear fender and quarter panels 14, and borders respectively the top and lateral extremities of the vehicle's rear window or backlight 190. Throughout the full length of the reinforcement 10 and integral with its inner wall 191 (see Figure 15) is a flange 192 extending inwardly therefrom (i. e. toward the backlight 190), which at final assembly is conveniently pinch welded to the rear end of the roof panel 8 and, along the sides of the backlight, to the upper marginal edges of the front fender and quarter panel 14. As shown in Figure 15, a double thickness of sheet metal is thus obtained which serves to support the backlight through a rubber weather-strip 193.

Package tray

Figure 11:
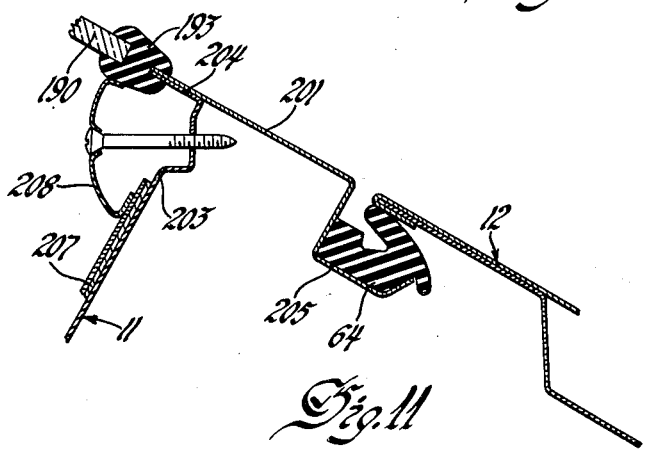
Figure 11 is an enlarged sectional view taken on lines 11—11 of Figure 1 showing the association of the backlight and deck lid to the package tray.

The package tray 11 (Figure 3) is a two-piece welded sheet metal assembly comprising a shelf member 200 and deck center panel 201. The shelf member 200 has a generally rectangular and flat horizontal forward portion 202 and an integral rearwardly and upwardly slanting rear portion 203, with the rear marginal edge of the latter having an upwardly turned flange 204 as shown in Figure 11. The deck center panel borders the bottom of the backlight 190 and, with the flange 204 to which it is pinch welded, supports the same through the weather-strip 193. 207 is a decorative covering on the shelf member 200, and 208 is the usual trim moulding which borders the four sides of the backlight 190. The deck center panel 201 is provided along its rear marginal edge with an integral gutter channel 205 in which is disposed the flexible rubber sealing element 64 which bears against the underside of the deck lid 12 when the latter is in closed position. The sides of the package tray adjacent the front of the shelf member 200 overlie the flanges 173 provided on the rear wheelhouse inner panels 13, as shown in Figure 17, and are pinch welded thereto at final assembly.

Rear fender and quarter panels

Each rear fender and quarter panel 14 is a two-piece sheet metal assembly comprising a lower-skirt section 210 extending below the level of the underbody's rear floor panel 34 and an upper section 211 which is joined to the lower section at final assembly. Both the upper and lower sections have their front marginal edges provided with an inwardly extending portion 212 and forwardly extending flnge 213 forming a recess for the rear doors 16, and at final assembly are secured to the rear hinge lower pillar 68 of the side frames 9 by spot welding their flanges 213 to the outer wall thereof as shown in Figures 6 and 17. The front marginal edge of the upper section 211 is similarly welded to the rear hinge upper pillar assembly 82, and the upper marginal edge of this section between the backlight 190 and the upper end of the pillar assembly 82 has an offset tab-like portion 214 which underlies the rear lateral extremity of the roof panel 8 and a conventional metal finish junction is provided between them at final assembly. Immediately to the rear of the tab-like portion 214 the upper marginal edge of the upper section 211 overlies and is pinch welded to the flange 192 on the backlight opening reinforcement 10 as previously referred to. Rearwardly of the backlight 190 the upper marginal edge of the upper section 211 is provided with an integral upwardly open gutter channel 215, similar to the gutter channel 205 on the deck center channel 201 and forming a continuation thereof around the upper outer corner and along the side of the deck lid 12 to the rear panel 60. The rear ends of the upper and lower sections 211 and 210 terminate with inwardly extending flanges 217 and 218, respectively, (Figure 17) which overlie and are spot welded at final assembly to the web portion 61 of the transversely extending rear panel 60, the latter having a rounded profile at each end to accommodate the transverse curvature of sections 210 and 211.

The lower section 210 of each rear fender and quarter panel 14 is provided along its upper marginal edge with an inwardly offset flange 219 (Figure 17) which underlies and is pinch welded at final assembly to the lower marginal edge of the upper section 211. Rearwardly of the rear wheelhouse inner panel 13, the downwardly extending flange 48 on the underbody's rear floor panel 34 is interposed between the offset flange 219 and the upper section 211. A trim moulding strip 216 of conventional design is subsequently added to cover this joint between the upper and lower sections 210, 211.

Engine hood panel and deck lid

Figure 13:
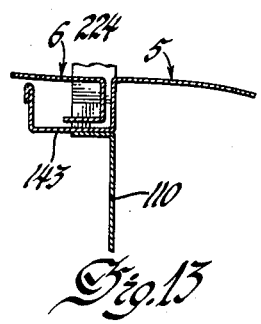
Figure 13 is a detail sectional view taken on lines 13—13 of Figure 1 showing the juncture of the front fender and quarter panel to the front end structure's wheelhouse inner panel and the association therewith of the engine hood panel.

Both the engine hood panel 6 and the deck lid 12 are of generally conventional construction, being hingedly connected to the body-frame preferably at their rearward and forward ends, respectively. In closed position the rear marginal edge of the hood panel 6 presses downward in sealing engagement with the flexible sealing element 130 disposed in the cowl center panel's gutter channel 129 (Figure 14), and the downwardly extending flange 224 which is provided along each side marginal edge projects into the gutter channel 143 formed integrally with the adjacent front fender and quarter panel 5, as is seen in Figures 13 and 14. The deck lid 12 in closed position rests, as shown in Figures 2, 11 and 17, on the flexible rubber sealing element 64 disposed in the gutter channels 63, 205 and 215 provided by the rear panel 60, deck center panel 201, and the rear fender and quarter panels 14, respectively.

Doors

The front and rear doors 15 and 16, as shown in Figures 18 and 19, each comprises a lower frame 225, of more or less conventional construction, and a novel, one-piece, die cast, inverted U-shaped upper frame 226, the lower ends of which extend into the lower frame and are secured thereto by threaded fasteners 227. The lower frame 225 extends upward only to the belt line and is formed of the usual spaced apart inner and outer panels 228 and 229 which are rigidly secured together by crimping the front and rear and bottom marginal edges of the outer panel 228 around the edges of the inner panel 229 in the manner illustrated in Figures 20 and 21. The upper marginal edges of the inner and outer panels are turned inwardly toward each other in accordance with conventional practice to provide a sill on each side of the windows 230, as shown in Figure 22.

The upper frames 226, various sections of which are shown in Figures 9, 10 and 12, provide both an outer trim flange 231 and a channel 232 for supporting the windows 230 or the weather-strip 233. Aluminum is preferably employed as the material of the upper frame on account of its high strength-to-weight ratio and resistance to corrosion, although of course various metals and alloys suitable for die casting may be used.

Two important advantages obtained by the use of the separate die cast upper door frames 226 are the considerable saving of material normally stamped out as scrap in forming the upper frame integral with lower, and the economical style modification which is possible through the use of different section designs for different car models.

As shown in Figures 7, 9, 10 and 12 the usual packing strips 234, 235 of soft rubber or equivalent material are cemented to the inner marginal faces of the door upper and lower frames 225, 226 to seal against the outer faces of the side frame members when the doors are in closed position.

We claim:

1. In a body-frame structure for an automotive vehicle, a side frame defining one or more door openings into the vehicle and including a front pillar of inwardly open channel section, the front wall of said pillar having a forwardly extending flange along its inner edge, bracing means for said pillar including a transversely extending dash panel located forwardly of said pillar, a dash end panel anchored to said pillar front wall flange and provided along its front and rear extremities with outwardly and inwardly extending flanges anchored to the dash panel and to the rear wall of the pillar, respectively, and a front wheelhouse inner panel consisting of a one-piece substantially flat stamping extending forwardly from the dash panel and terminating rearwardly in an outturned flange welded to the front face of said dash panel in inwardly offset relation to said dash end panel.

2. In an integral body-frame structure for a front-engine automotive vehicle, a bumper-to-bumper length underbody including spaced-apart longitudinal members defining its lateral extremities forwardly of the passenger compartment and a floor panel under the passenger compartment and terminating at the forward end thereof with an upwardly inclined toe board portion, left and right wheelhouse inner panels consisting of one-piece substantially flat stampings extending from the front of the underbody to the passenger compartment and welded along their lower margins to the respective longitudinal members, a transversely extending dash panel welded to the rearward extremities of the wheelhouse inner panels and to forward extremities of the toe board portion, longitudinally extending left and right dash end panels outwardly offset from said wheelhouse inner panels and welded to the lateral extremities of the dash panel and toe board portion, left and right side frames defining door openings into the passenger compartment and including front pillars welded to the dash end panels, and left and right front fender and quarter panels welded to the forward and upper extremities of the wheelhouse inner panels and to the front pillars of the side frames to cooperate with the wheelhouse inner panels in bracing the dash panel, dash end panels and side frames against movement relative to the underbody.

3. In a body-frame for an automotive vehicle having a passenger compartment the front end of which is defined in part by a windshield, an upstanding and transversely extending dash panel terminating adjacent the lower margin of said windshield, and a transversely extending instrument panel of forwardly presenting C-section with each leg of the C having its forward edges joined by the dash panel to form a closed box section cross beam at the front end of the passenger compartment.

4. In a body-frame for an automotive vehicle, a side frame defining a door opening into the side of the vehicle, and including a front lower pillar member of inwardly presenting channel section forming the front margin of the door opening below the belt line, a roof rail of upwardly open channel section forming the rear portion of the upper margin of the door opening, and a curved front upper pillar assembly forming the margin of the door opening between said front lower pillar member and roof rail, said assembly consisting exclusively of two parts, one of said parts being a curved channel section member having its rear end in nested relation with the front end of the roof rail and its front end embraced by the front and rear walls of the channel section front lower pillar member, and the other of said parts being a spanner strip interconnecting the open edges of said channel section first part and forming a box section therewith between the front lower pillar member and the roof rail.

5. In an integral body-frame structure for a front-engine automotive vehicle, a bumper-to-bumper length underbody, a passenger compartment enclosing shell mounted on the underbody and including a dash panel constituting part of the front wall of said shell, forward bracing for said shell provided by front wheelhouse inner panels of one-piece substantially vertical and flat sheet metal section extending along opposite marginal extremities of the underbody from the front end thereof to said dash panel and extending upwardly from the underbody to define the upper extremities of the vehicle forwardly of the passenger compartment, said wheelhouse inner panels having outwardly extending flanges securing their rear marginal edges to the dash panel and their bottom marginal edges to the underbody.

6. In a body-frame for an automotive vehicle, an underbody including a floor panel the side margins of which have recesses providing clearance for the vehicle's rear wheels, side frames defining door openings into the vehicle forwardly of said recesses, rear wheelhouse inner panels anchored along their lower edges to the recessed side margins of the floor panels and along their front edges to the side frames, rear fender and quarter panels disposed oppositely of and extending rearwardly of the wheelhouse inner panels, said rear fender and quarter panels being anchored to the floor panel rearwardly of the recesses and to the side frames forwardly thereof and cooperating with the wheelhouse inner panels to provide upwardly closed housings for the rear wheels, and sealing strips of soft resilient material compressed between the inner wall surfaces of the rear fender and quarter panels and the upper and rear edges of the wheelhouse inner panels.

7. In a body-frame for an automotive vehicle, an underbody including a floor panel the rear and adjacent side marginal edges of which define the rear and adjacent lateral extremities of the underbody, an upwardly extending flange integral with the rear marginal edge of the floor panel, a transversely extending rear panel of inwardly presenting channel form having its web anchored to said floor panel flange and terminating beyond the lateral extremities of the underbody at each side of the vehicle, rear fender and quarter panels anchored to the side edges of the floor panel and having its rear ends terminating with inwardly extending flanges anchored to the termini of the rear panel's web.

8. The invention defined in claim 7 with the addition of upwardly open gutter channels formed in the upper forwardly extending wall of the rear panel and in the adjacent upper margin of the rear fender and quarter panels, said gutter channels serving to support the rear and side marginal extremities of the vehicle's rear deck lid.

9. An automotive vehicle body structure having a passenger compartment front wall including a windshield in vertically adjacent relation with the upstanding upper portion of a transversely extending dash panel and an instrument panel of forwardly presenting C-section with each leg of the C having its forward extremities welded to said dash panel to form a closed box-sectioned construction therewith.

10. In a self-supporting body for automobiles, a threshold sill along each side of the body between the front and rear wheel locations, a floor panel interconnecting said sills, a cross beam interconnecting and front posts secured to the front end portions of said sills, a cowl and transverse wall structure secured to the front end of said floor panel and to said sills and posts, said transverse wall structure extending from said sill to the top of said cowl, auxiliary sill members inwardly spaced from said sills and terminating at and secured by their rear ends to said cross beam, a wheel housing structure on each side of the body being made separately from said cowl and transverse wall structure and being secured along its lower margin to the respective auxiliary sill member, said wheel housing structure extending substantially full height to its rear margin, abutting said transverse wall structure, and being secured by said margin over its full height to said transverse structure for bracing the sill extension against the body.

11. In a self-supporting automobile body: side sills extending rearwardly from points adjacent the rear of front wheel locations; front posts connected to the forward portions of said sills; a floor panel interconnecting said sills and extending forwardly at least to said posts; a cross beam interconnecting forward portions of said sills; sill members inwardly offset with respect to said side sills and extending forwardly from said cross beam to which they are secured; said cross beam having at least its middle portion, including the attachment zone for said sill members, arranged rearwardly of the location of said posts; said sill members bearing against the underside of said floor panel in front of said cross beam; a cross member inserted between said sill members, being forwardly spaced from said cross beam, and being adapted for carrying the motor of the automobile; and means bracing the forward portions of said sill members against the middle part of the body above the side sills.

12. In a body-frame structure for an automotive vehicle, a side frame defining one or more door openings into the vehicle and including a front pillar of inwardly open channel section, the front wall of said pillar having a forwardly extending flange along its inner edge, bracing means for said pillar including a transversely extending dash panel located forwardly of said pillar, a dash end panel anchored to said pillar front wall flange and secured by an inwardly extending flange on its rear edge to the rear wall of the pillar, and secured along its front edge to the dash panel by an outwardly extending flange connection accessible for pinch welding the said dash end panel to the side edge of the said dash panel.

13. In an integral body-frame structure for a front-engine automotive vehicle, a bumper-to-bumper length underbody including spaced-apart longitudinal members defining its lateral extremities forwardly of the passenger compartment and a floor panel under the passenger compartment continued at the forward end thereof by transversely and upwardly extending toe board portion and dash panel, left and right wheel house inner panels consisting of one-piece substantially flat stampings extending from the front of the underbody to the passenger compartment and welded along their lower margins to the respective longitudinal members, said transversely extending dash panel welded to the rearward extremities of the wheelhouse inner panels, longitudinally extending left and right dash end panels outwardly offset from said wheelhouse inner panels and welded to the lateral extremities of the dash panel and toe board portion, left and right side frames defining door openings into the passenger compartment and including front pillars welded to the dash end panels, and left and right front fender and quarter panels welded to the forward and upper extremities of the wheelhouse inner panels and to the front pillars of the side frames to cooperate with the wheelhouse inner panels in bracing the dash panel, dash end panels and side frames against movement relative to the underbody.

14. In a self-supporting body for automobiles, a threshold sill along each side of the body between the front and rear wheel locations, a floor panel interconnecting said sills, a cross beam interconnecting and front posts secured to the front ends of said sills, a cowl and transverse wall structure, including a dashboard, secured to the front end of said floor panel and to said sills, said transverse wall structure extending from said sills to the top of said cowl, sill members inwardly offset from said sills and secured to said cross beam, an inner wheel housing wall on each side made separately from said cowl and transverse wall structure being secured along its lower margin to one of said sill members, each of said inner wheel housing structures ending at and being secured abuttingly along the entire height of its rear margin to said dashboard at a distance inwardly spaced from the sides of said cowl, and an outer wheel housing wall on each side extending rearwardly beyond said dashboard and the rear margin of the respective inner wheel housing structure and overlying the respective side of said cowl, and being secured to the respective post.

References Cited in the file of this patent

UNITED STATES PATENTS

| | | |
|---|---|---|
| 1,533,093 | Booth | Apr. 14, 1925 |
| 1,644,826 | Goddard | Oct. 11, 1927 |
| 1,652,865 | Ledwinka | Dec. 13, 1927 |
| 1,855,429 | Toncray | Apr. 26, 1932 |
| 1,996,601 | Widman | Apr. 2, 1935 |
| 2,075,936 | Graebner et al. | Apr. 6, 1937 |
| 2,091,059 | Tjaarda | Aug. 24, 1937 |
| 2,113,075 | Breer et al. | Apr. 5, 1938 |
| 2,115,903 | Breer et al | May 3, 1938 |
| 2,122,444 | Tjaarda | July 5, 1938 |
| 2,140,476 | Ledwinka | Dec. 13, 1938 |
| 2,188,891 | Haltenberger | Jan. 30, 1940 |
| 2,208,723 | Doty | July 23, 1940 |
| 2,218,814 | Duffy | Oct. 22, 1940 |
| 2,234,221 | Avery et al. | Mar. 11, 1941 |
| 2,260,997 | Ledwinka | Oct. 28, 1941 |
| 2,289,395 | Ulrich | July 14, 1942 |
| 2,307,445 | Benzick | Jan. 5, 1943 |
| 2,362,077 | Ledwinka et al. | Nov. 7, 1944 |
| 2,382,923 | Trautvetter | Aug. 14, 1945 |
| 2,404,870 | Ulrich | July 30, 1946 |
| 2,437,664 | Hicks | Mar. 9, 1948 |
| 2,474,992 | Stephenson et al. | July 5, 1949 |
| 2,488,471 | Kramer et al. | Nov. 15, 1949 |
| 2,520,074 | Wernig et al. | Aug. 22, 1950 |
| 2,525,339 | Chausson | Oct. 10, 1950 |
| 2,588,643 | Maxwell | Mar. 11, 1952 |

FOREIGN PATENTS

| | | |
|---|---|---|
| 762,366 | France | Jan. 22, 1934 |
| 854,141 | France | Jan. 4, 1940 |